E. SCHNEIDER.
MOTOR CAR HAVING FOUR DRIVING WHEELS FOR THE TRANSPORT OF GUNS.
APPLICATION FILED JUNE 9, 1921.
1,396,599.
Patented Nov. 8, 1921.
3 SHEETS—SHEET 1.
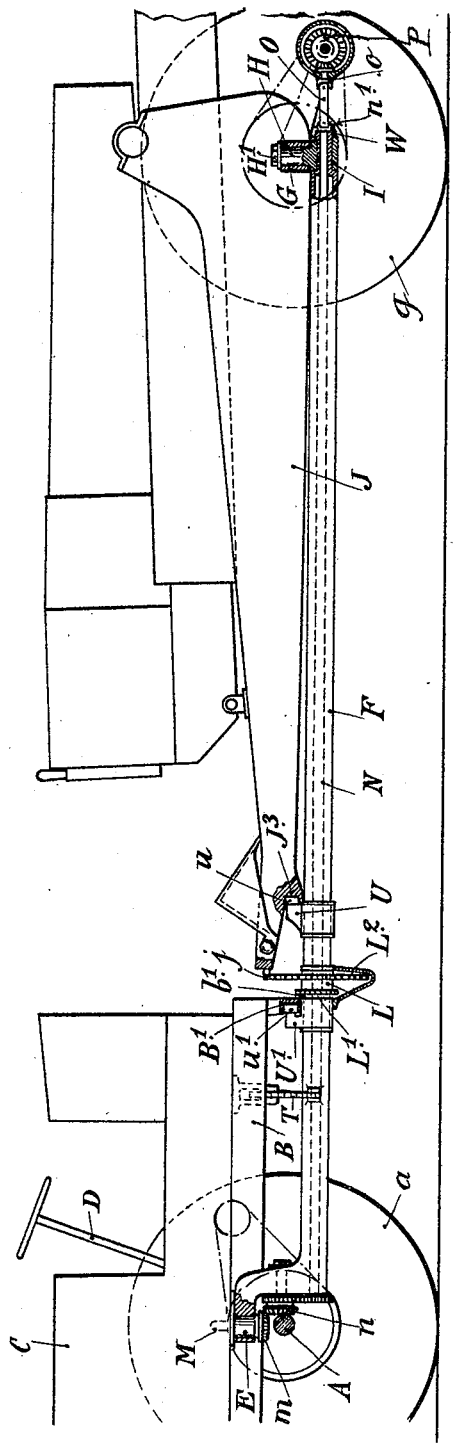
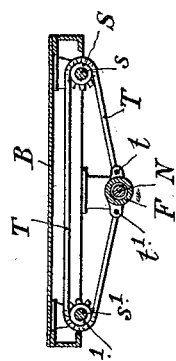

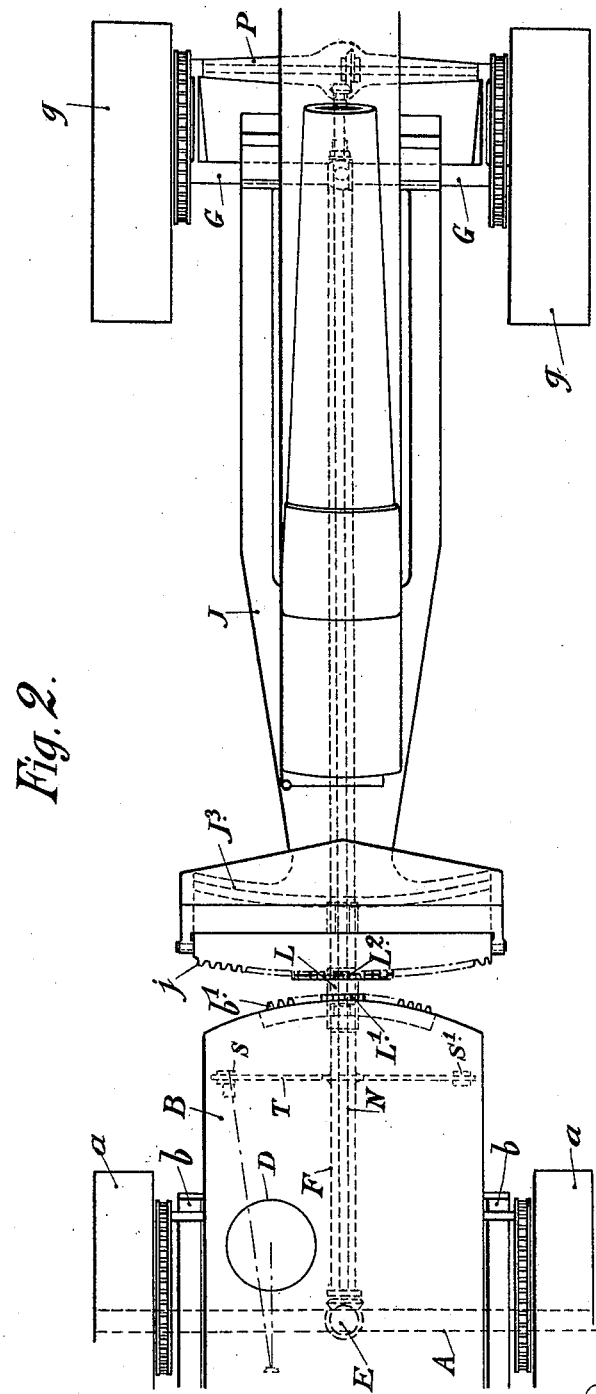

E. SCHNEIDER.
MOTOR CAR HAVING FOUR DRIVING WHEELS FOR THE TRANSPORT OF GUNS.
APPLICATION FILED JUNE 9, 1921.

1,396,599.

Patented Nov. 8, 1921.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

MOTOR-CAR HAVING FOUR DRIVING-WHEELS FOR THE TRANSPORT OF GUNS.

1,396,599.          Specification of Letters Patent.      Patented Nov. 8, 1921.

Original application filed October 29, 1920, Serial No. 420,527. Divided and this application filed June 9, 1921. Serial No. 476,300.

*To all whom it may concern:*

Be it known that I, EUGÈNE SCHNEIDER, a citizen of the Republic of France, and a resident of Paris, France, have invented new and useful Improvements in Motor-Cars Having Four Driving-Wheels for the Transport of Guns, which invention is fully set forth in the following specification.

This invention has for its object to provide an improved motor-car having four driving wheels for the transport of guns shown and described in my earlier application Serial No. 420,527, filed October 29, 1920, of which the present application is a division.

This improved car comprises two trucks connected together in such a manner as to be capable at all times of being deflected simultaneously through the same angle and in reverse direction relatively to the axial line joining the centers of their road axles, while the same trucks are capable at all times of executing a transverse rocking motion in any direction and through any angle relatively to the same axial line.

The chassis of these trucks carry each, for for this purpose, a vertical pivot pin around which the respective road axle is adapted to turn. These said chassis are provided on their inner side with a toothed sector receiving its motion from a toothed member carried by a connecting bar connecting the centers of their road axles.

The improved car is more particularly designed for the transport of guns, the chassis of the front truck carrying the engine, whereas the transported load is carried on the chassis of the hind truck. The chief improvements made in the car for this purpose consist of a particular construction of the chassis of the hind truck for utilizing a portion of the parts of the gun, both as regards the constitution of the vertical pivot pin of the hind road axle and that of the toothed sector driven from the connecting bar between the road axles of the two trucks. A further improvement consists in a peculiar construction of the said connecting bar for mounting the gear transmitting the motion of the engine to the hind wheels.

The member for driving the toothed sectors of the chassis on the connecting bar is constructed in a peculiar manner so as to allow the use of a hind truck of suitable length for carrying the load, while permitting at all times of each truck being turned through an equal angle and in the reverse direction.

In order that the invention may be more readily understood, reference is had to the accompanying drawings, in which—

Figures 1 and 2 illustrate respectively in elevation and in plan one constructional form of the carriage embodying the principles of my invention;

Fig. 5 is a detail.

Figure 3:
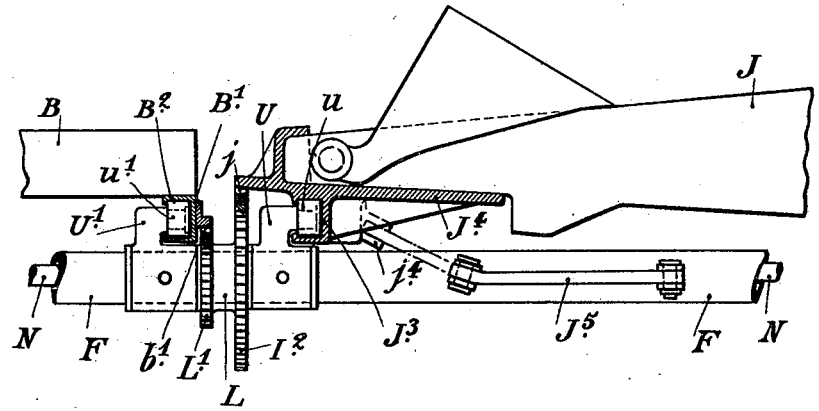
Fig. 3 is a view in partial elevation.

The improved car comprises a fore-carriage such as described in French Patent No. 493,636, dated Dec. 5, 1918. A is the road axle of this fore-carriage; $a$ and $a$ are the wheels. From this axle there is suspended by means of springs $b$ a chassis B that carries the engine C and the steering mechanism D. E is a vertical pivot pin projecting from the underside of the chassis B. The chassis B is provided at its rear end with an arc $B^1$ provided with teeth $b^1$ having its center in the middle of the road axle A. These teeth, as will be seen hereinafter, are in constant mesh with the special driving member mounted on the hollow bar F that connects the road axle of the fore-carriage to the road axle of the hind carriage.

The hind carriage comprises a road axle G fitted with the wheels $g$. In the middle of this road axle there is engaged a vertical pivot pin H carrying at its lower end a horizontal sleeve I that serves as a bearing for the rear end of the connecting bar F.

The rear carriage comprises the axle and wheels of a trail gun carriage, the trail J constituting the chassis.

The trail tail plate is provided with an arc track $J^3$ adapted to bear on a roller $u$ mounted on an arm U fixed to the connecting bar F, the track having its center in the geometrical axis of the pivot pin H. The trail plate is also provided with a toothed sector *j* having its center in the axis of pin H and is adapted to mesh with a large pinion L² on a sleeve L loose on bar F. This sleeve also carries a small pinion L¹ fast thereto which meshes with teeth *b*¹ on curved member B¹ on the fore-truck. The ratio between the numbers of the teeth of these pinions is equal to the ratio between the lengths of the radii of the toothed sectors L¹ and *j*.

The motion of the engine mounted on the chassis B of the fore-truck is transmitted to the road wheels *a* in the usual manner through the medium of a differential. The gear for transmitting the motion of the engine to the hind road wheels is effected through the medium of a vertical shaft M carrying a bevel toothed wheel *m*, the said shaft being coaxial with the pivot pin E. The pinion *m* meshes with a bevel pinion *n* fixed on the end of a shaft N revolving inside the hollow connecting bar F.

The rear end of the shaft N is connected by a Cardan joint *n*¹ to an intermediate shaft O which is connected in its turn by a Cardan joint *o* to the differential P, whereby the motion is transmitted in the usual manner to the road wheels *g* of the hind carriage.

It will be perceived that the transverse rocking of the hind road axle relatively to the connecting bar F is effected by the sleeve I rotating on the rear extension of the said bar, whereas the front road axle is able to turn transversely with the bar F.

The simultaneous turning of the two trucks are produced by means of the steering device D terminating in a bracket fixed to the chassis B. A chain T, attached at its ends *t*, *t*¹ to the connecting bar F, is adapted to be wound on the pinion S and on a second pinion S¹ fixed on a shaft *s*¹ journaled in another bracket carried by the chassis B.

The pull of the pinion S upon the chain T attached to the bar F, which latter is prevented from turning, produces a turning movement of the fore-carriage, and through the medium of the teeth *b*¹ and of the driving gear L¹—L—L², it produces also the turning movement of the teeth *j* and consequently a turning movement of the hind carriage.

The teeth *b*¹ and *j*, instead of being formed as spur-teeth on the sectors, may of course be formed as crown teeth projecting from the underside of the corresponding sectors in such a manner as to engage vertically between the teeth of pinions L¹ and L² instead of engaging horizontally therewith.

When it is desired to separate the combination of the fore-carriage carrying the engine and the connecting bar F from the gun, it is sufficient to provide a support for the trail J, such as a jack not shown, then to remove the pin of the cardan joint *n*¹ and unscrew stop-nut *w* placed on the end of the shaft N. It is then possible to remove the fore-carriage and the bar F which carries with it the shaft N. The pivot pin H, together with sleeve I carried by it, remain in position upon the road axle G, being kept back by the nut H¹.

Figure 4:
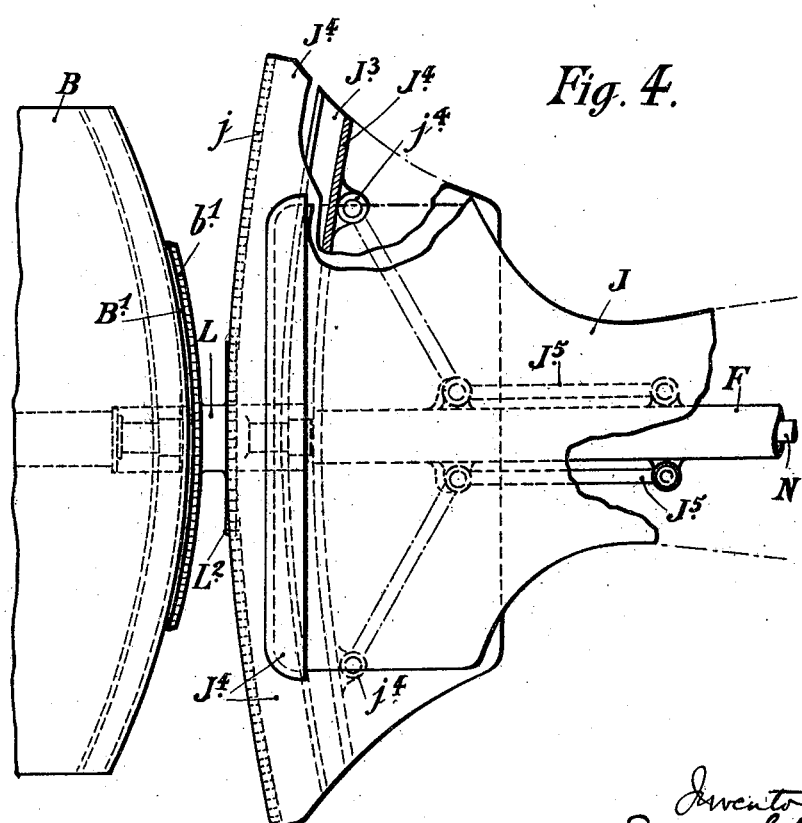
Fig. 4 is a view in plan, showing a modification of the improvement.

In the modification shown in Figs. 3 and 4, the teeth *j* and the arc track J³ are formed on a part J⁴ which is independent of the trail J, and into which the trail tail plate can be fitted for transport. This independent part J⁴ may, when the gun is separated from the fore-carriage and the bar F, be held upon the latter by means of two links J⁵. These links occupy during transport, the position shown in full lines in which they are pinned upon the bar F.

For the purpose of fixing the part J⁴ upon the bar when the gun has been removed, the said links are brought into the position indicated in dotted lines, by pinning them to lugs *j*⁴ formed on the said part.

What is claimed is:—

1. In a motor-driven car for transporting guns, the combination of a motor-driven forward wheeled truck having steering means and a rear wheeled trail gun carriage, a tubular draw-bar having flexible connections with said truck and carriage, a drive shaft housed in said draw-bar and having drive connections with said motor and driving connections with said rear carriage wheels, said forward truck having a toothed sector the center of which is in a line perpendicular to its truck axle at the center of the latter, a trail supporting plate, anti-friction bearings between said plate and draw-bar, said plate having a curved toothed sector having its center in a line normal to the center of the gun carriage axle and gear connections between said toothed sectors carried by said draw-bar for transmitting steering movements of the front truck to the rear gun carriage.

2. In a motor-driven car as defined in claim 1, wherein said connections between said drive shaft and rear wheels include differential gearing having a separable cardan-joint connection with said drive shaft and wherein the end of said tubular draw-bar has a separable connection with the rear carriage axle.

3. In a motor-driven car for transporting guns, the combination of a motor-driven forward wheeled truck having steering mechanism and a rear wheeled trail gun carriage, a tubular draw-bar having flexible connections with said truck and carriage, a drive shaft housed in said draw-bar and having drive connections with said motor and driving connections with said carriage wheels, said forward truck having a toothed sector the center of which is in a line perpendicular to its truck axle at the center of the latter, a trail supporting plate having means for locking the same and the trail in transporting position, anti-friction bearings between said plate and draw-bar, said plate having a curved tooth sector having its center in a line normal to the center of the gun carriage axle and gear connections between said toothed sectors carried by said draw-bar for transmitting steering movements of the front truck to the rear gun carriage.

In testimony whereof I have signed this specification.

EUGÈNE SCHNEIDER.

Witnesses:
 ANDRÉ MOSTICKER,
 LOUIS GARDET.